United States Patent [19]
Kawasaki et al.

[11] Patent Number: 5,244,996
[45] Date of Patent: Sep. 14, 1993

[54] HOT-MELT ADHESIVE

[75] Inventors: Masaaki Kawasaki; Shuji Minami; Hiroaki Kitani; Junichi Yoshitake, all of Yamaguchi, Japan

[73] Assignee: Mitsui Petrochemical Industries, Ltd., Tokyo, Japan

[21] Appl. No.: 778,208

[22] PCT Filed: Apr. 17, 1991

[86] PCT No.: PCT/JP91/00508
§ 371 Date: Dec. 18, 1991
§ 102(e) Date: Dec. 18, 1991

[87] PCT Pub. No.: WO91/16386
PCT Pub. Date: Oct. 31, 1991

[30] Foreign Application Priority Data

Apr. 18, 1990 [JP] Japan .................................. 2-102162
May 17, 1990 [JP] Japan .................................. 2-127655

[51] Int. Cl.$^5$ ..................... C09J 123/18; C09J 125/08; C08L 23/18; B32B 15/04
[52] U.S. Cl. ..................... 526/347; 526/346; 526/125; 525/241; 156/334; 428/461; 428/483; 428/513; 428/523; 428/537.5
[58] Field of Search ..................... 526/347, 346, 935; 524/578; 156/334; 525/241; 428/461, 513, 537.5, 523, 483

[56] References Cited

U.S. PATENT DOCUMENTS 3,644,252  2/1972  Shenfeld et al. ................ 526/347 X

FOREIGN PATENT DOCUMENTS 0331410  9/1989  European Pat. Off. .
0344021  11/1989  European Pat. Off. .

OTHER PUBLICATIONS

WPIL/Derwent Abstract of Japanese Laid-Open Patent Publication No. 04-001215 (Jan. 6, 1992).
WPI/Derwent Abstract of Japanese Laid-Open Patent Publication No. 52-081393 (Jul. 7, 1977).

*Primary Examiner*—Fred Teskin
*Attorney, Agent, or Firm*—Sherman and Shalloway

[57] ABSTRACT

A random copolymer of an α-olefin having 4 to 12 carbon atoms with an aromatic vinyl monomer containing 50 to 98% by mol of α-olefin and having a softening point of 40° to 150° C. is useful as a hot-melt adhesive and is excellent in adhesiveness, workability, environmental aging resistances such as thermal aging resistance. The copolymer is combined with 70 to 10% by weight of a tackifier for the whole so that it can be used as a hot-melt adhesive or a heat sealant.

7 Claims, No Drawings

HOT-MELT ADHESIVE

BACKGROUND OF THE INVENTION

Field of the Invention

The present invention relates to a hot-melt adhesive comprising a random copolymer of an α-olefin having 4 to 12 carbon atoms with an aromatic vinyl monomer. More particularly, the present invention relates to a hot-melt adhesive comprising a copolymer of an α-olefin having 4 to 12 carbon atoms with an aromatic vinyl monomer, which is excellent in adhesiveness, workability and environmental aging resistances such as thermal aging resistance, and can be used in various fields such as packaging, bookmaking, pouchmaking, woodworking, can manufacturing, construction and sanitary use.

The present invention also relates to a composition comprising the above-mentioned copolymer and a tackifier, which can be used as a hot-melt adhesive or a heat sealant.

Recently, the hot-melt adhesive has been increasingly used in various fields since it is superior to prior art solvent type adhesive in coating properties, safety, cleanness for working atmosphere and energy savings. Compositions including a base polymer such as natural rubber, ethylene-vinyl acetate copolymer, a styrene-butadiene-styrene block copolymer have been used as prior art hot-melt adhesives and heat-sealing adders.

However, since the compositions including a base polymer such as natural rubber, a styrene-butadiene-styrene block copolymer, a styrene-isoprene-styrene copolymer have a lot of double bonds, they are poor in thermal resistance stability and have problems that oxidation, decomposition and coloring do not only occurs on application, but also the bonding performance changes with time after bonding. An ethylene-vinyl acetate copolymer based composition has a poor adhesiveness to polyolefin resins such as polyethylene and polypropylene.

For the prior art hot-melt adhesive, it is generally necessary to compound a tackifier into a base polymer. A single-component resin for adhesive having both performances of the base polymer and the tackifier has been demanded for simplicity of steps and preventing variations of products on compounding.

SUMMARY OF THE INVENTION

The present inventors have found from the intensive study for providing a resin for adhesive which is excellent in adhesiveness, workability and environmental aging resistances such as thermal aging resistance that a random copolymer including a given α-olefin and an aromatic vinyl monomer is excellent in the aforementioned characteristics and have completed the present invention.

The present invention aims at overcoming the above-mentioned problems which the prior art has encountered.

It is an object of the present invention to provide a hot-melt adhesive comprising an α-olefin aromatic vinyl monomer copolymer which is excellent in adhesiveness, workability and environmental aging resistance.

In accordance with the present invention, there is provided a hot-melt adhesive comprising a random copolymer of an α-olefin having 4 to 12 carbon atoms with an aromatic vinyl monomer, said α-olefin unit being contained in an amount of 50 to 98% by mol in the copolymer, said copolymer having a melting viscosity in the range of 1000 to 100,000 centipoise at 200° C. and a softening point in the range of 40° to 150° C.

In accordance with the present invention, there is also provided a composition, comprising:
(A) 30 to 90% by weight of α-olefin based random copolymer including an unit derived from an α-olefin having 4 to 12 carbon atoms and an unit derived from an aromatic vinyl monomer;
  (i) the unit derived from the α-olefin being in the range of 50 to 96% by mol; and
  (ii) the intrinsic viscosity [η] which is measured in decahydronaphthalene at 135° C. being in the range of 0.01 to 7 dl/g;
(B) 70 to 10% by weight of tackifier.

DETAILED DESCRIPTION OF PREFERRED EMBODIMENTS

In accordance with the present invention, by performing a random copolymerization between an α-olefin having 4 to 12 carbon atoms and an aromatic vinyl monomer by maintaining the content of the α-olefin in the range of 50 to 98% by mol, the softening point can be maintained in the range from 40° to 150° C. which is suitable for a hot-melt adhesive and the adhesive power to various substrates can be remarkably enhanced while environmental aging resistances such as thermal aging resistance can be remarkably improved.

It is deemed that an improvement in environmental aging resistance in the present invention is due to a fact that substantially all the main chains of the polymer are formed of single bonds between carbon atoms and no double bonds between ethylene-carbon atoms are contained in the main chains, but are contained in side chains.

In the random copolymer of the present invention, alkyl side chains based on an α-olefin having 4 to 12 carbon atoms and aryl (phenyl) side chains based on aromatic vinyl group co-exist randomly, and it is understood that combination of these side chains provides an excellent adhesive power to a substrate and melt flow properties suitable for a hot-melt.

Specifically, the α-olefin having 4 to 12 carbon atoms includes butene-1, pentene-1, hexene-1, heptene-1, octene-1, nonene-1, decene-1, undencene-1, and pentene-1 are preferably used. The α-olefin may be used alone or a combination of two or more α-olefins may be used.

The aromatic vinyl monomer which constitutes the α-olefin-aromatic vinyl random copolymer specifically includes styrene, alkyl substituted styrene such as α-methylstyrene, o-methylstyrene, m-methylstyrene, p-methylstyrene, o-ethylstyrene, m-ethylstyrene, p-ethylstyrene, propylene styrene, butylstyrene; halogen substituted styrene such as chlorostyrene and bromostyrene; and vinylnaphthalene such as 1-vinylnaphthalene, 2-vinylnaphthalene, and 1-vinyl-4-methylnaphthalene. Among them, styrene and vinyltoluene (methylstyrene) are preferable.

The aromatic vinyl monomers which form an α-olefin-aromatic vinyl random copolymer may be used alone and a combination thereof may be used.

The α-olefin-aromatic vinyl random copolymer may be provided by copolymerization of the above mentioned monomers with the other copolymerizable monomers such as ethylene and propylene which is contained in such an amount that the object of the present invention is accomplished, generally at not higher than 30% by mol, particularly not higher than 10% by mol per the total amount of both monomers.

In the α-olefin-aromatic vinyl random copolymer, the unit derived from the α-olefin having 4 to 12 carbon atoms is in the range of 50 to 98% by mol, preferably 60 to 96% by mol and the unit derived from the aromatic vinyl monomer is in the range of 2 to 50% by mol, preferably 4 to 40% by mol.

The intrinsic viscosity [η] of the random copolymer measured in decahydronaphthalene at 135° C. is in the range of 0.01 to 7 dl/g, preferably 0.1 to 5 dl/g. This characteristic value is a measure representative of the molecular weight of the α-olefin random copolymer and serves to provide a random copolymer having the above-mentioned excellent properties in combination with the other characteristic value.

The melting viscosity of the α-olefin-aromatic vinyl random copolymer at 200° C. is in the range of 1000 to 100,000 centipoise, preferably 2000 to 80,000 centipoise. This characteristics value is a measure of coating properties when the hot-melt adhesive of the present invention is used.

The softening point of the α-olefin/aromatic vinyl random copolymer measured by the ring and ball method is in the range of 50° to 150° C., preferably 70° to 130° C. This characteristic value is a measure of a maximum temperature when the hot-melt adhesive of the present invention is used.

Manufacturing of Random Copolymer

The α-olefin/aromatic vinyl random copolymer can be obtained by copolymerizing an α-olefin with an aromatic vinyl monomer in the presence of an olefin polymerizing catalyst.

The olefin polymerizing catalyst which is preferably used on copolymerization comprises a solid titanium catalyst component (a), an organic aluminium compound catalyst component (b), and an electron donor component (c) which is added if necessary.

The solid titanium catalyst component (a) contains as essential components, magnesium, titanium, halogen and an electron donor. The atomic ratio of magnesium/titanium is higher than 1, preferably 3 to 50, more preferably 6 to 30. The atomic ratio of halogen/titanium is higher than 1, preferably 4 to 100, more preferably 6 to 40. The molar ratio of the electron donor/titanium is preferably 0.1 to 10, more preferably 0.2 to 6. The specific surface area of the solid titanium catalyst component (a) is preferably no less than 3 m²/g, more preferably about 40 to 1000 m²/g, further more preferably about 100 to 800 m²/g.

A titanium compound cannot usually be separated from titanium catalyst component (a) by simple means such as washing with hexane at an ambient temperature. The X-ray spectrum of the catalyst component (a) shows that a magnesium compound is in the crystalline state or in the preferably very crystalline state in comparison with that of commercially available usual magnesium dihalide independently of the kind of a starting magnesium compound which is used for catalyst preparation. The titanium catalyst component (a) may contain other elements, metal and functional groups than the essential components and may be diluted with an organic diluent.

The solid state titanium catalyst component (a) is prepared by contacting the magnesium compound, the titanium compound and the electron donor (if necessary) with each other. On preparation of the solid titanium catalyst component (a), other reaction agents such as compounds of silicon, phosphorous, and aluminium may be used if necessary.

Such a solid titanium catalyst component (a) can be prepared according to any of methods disclosed in the specifications of Japanese Unexamined Patent Publication Nos. Sho 50-108385, 50-126590, 51-20297, 51-28189, 51-4586, 51-92885, 51-136625, 52-87489, 52-100596, 51-47688, 52-104593, 53-2580, 53-40093, 53-40094, 55-35102, 55-135103, 55-152710, 56-811, 56-11908, 56-8606, 58-83006, 58-138705, 58-138706, 58-138707, 58-138708, 58-138709, 58-138710, 58-138715, 60-23404, 61-21109, 61-37802, 61-37803. A method of manufacturing the solid state titanium catalyst component (a) will now be described.

Magnesium compounds can be used for preparing the solid titanium catalyst component (a). The magnesium compounds include magnesium compounds having a reducing power or having no reducing power.

The magnesium compounds having a reducing power may be an organic magnesium compound represented by, for example, a formula $X_nMgR_{2-n}$ wherein $0 \leq n \leq 2$, R represents a hydrogen atom or an alkyl group, an aryl group or cycloalkyl group having 1 to 20 carbon atoms and if n=0, two of R then may be the same or different groups, an X represents a halogen.

Specifically, the organic magnesium compounds having a reducing power include dimethyl magnesium, diethyl magnesium, dipropyl magnesium, dibutyl magnesium, diamyl magnesium, dihexyl magnesium, didecyl magnesium, ethyl magnesium chloride, propyl magnesium chloride, butyl magnesium chloride, hexyl magnesium chloride, amyl magnesium chloride, butyl ethoxy magnesium, ethyl butyl magnesium, octyl butyl magnesium, and butyl magnesium hydride. The magnesium compounds can be used alone or may form a complex compound with an organic aluminium compound. These magnesium compounds may be liquid or solid.

Specific examples of the magnesium compounds having no reducing power include magnesium halides such as magnesium chloride, magnesium bromide, magnesium iodide, and magnesium fluoride;

alkoxy magnesium halides such as methoxy magnesium chloride, ethoxy magnesium chloride, isopropoxy magnesium chloride, butoxy magnesium chloride, and octoxy magnesium chloride;

aryloxy magnesium halides such as phenoxy magnesium chloride, and methyl phenoxy magnesium chloride;

alkoxy magnesium such as ethoxy magnesium, isopropoxy magnesium, butoxy magnesium, n-octoxy magnesium, and 2-ethyl hexoxy magnesium; and carboxylates of magnesium such as magnesium laurate, and magnesium stearate.

These magnesium compounds having no reducing power may be compounds derived from the above-mentioned magnesium compounds having a reducing power or derived on preparation of the catalyst component. For deriving a magnesium compound having no reducing power from a magnesium compound having a reducing power, it will suffice to contact a magnesium compound having a reducing power with a polysiloxane compounds, a halogen containing compound such as a silane compound having halogen, an aluminium compound containing halogen, ester and alcohol or compound having an OH group or an active carbon-oxygen bond.

The magnesium compounds may be a complex compound between the above-mentioned magnesium compound and other metal and a mixture of the above-mentioned magnesium compound with a double compound or other metal compound. The magnesium compounds may be a mixture of two or more above-mentioned compounds and may be used in the form of liquid or solid. If the compound is solid, it may be liquified by using alcohols, carboxylic acids, aldehydes, amines, metal acid esters.

Among them, magnesium compounds having no reducing power are preferable, magnesium compounds having halogen are more preferable. Among them, magnesium chloride, alkoxy magnesium chloride and aryloxy magnesium chloride are preferably used.

There are various quadrivalent titanium compounds used for preparation of the solid titanium catalyst component (a). Usually a quadrivalent titanium compound represented by a formula $Ti(OR)_gX_{4-g}$ wherein R denotes a hydrocarbon group. X denotes a halogen atom and $0 \leq g \leq 4$ is used. Specific examples of the quadrivalent titanium compound include titanium tetrahalides such as $TiCl_4$, $TiBr_4$ and $TiI_4$;

alkoxy titanium trihalides such as
  $Ti(OCH_3)Cl_3$,
  $Ti(OC_2H_5)Cl_3$,
  $Ti(On-C_4H_9)Cl_3$,
  $Ti(OC_2H_5)Br_3$,
  $Ti(O-iso-C_4H_9)Br_3$;
dialkoxy titanium dihalides such as
  $Ti(OCH_3)_2Cl_2$,
  $Ti(OC_2H_5)_2Cl_2$,
  $Ti(On-C_4H_9)_2Cl_2$,
  $Ti(OC_2H_5)_2Br_2$;
trialkoxy titanium monohalides such as
  $Ti(OCH_3)_3Cl$,
  $Ti(OC_2H_5)_3Cl$,
  $Ti(On-C_4H_9)_3Cl$,
  $Ti(OC_2H_5)_3Br$; and
tetralkoxy titanium such as
  $Ti(OCH_3)_4$,
  $Ti(OC_2H_5)_4$,
  $Ti(On-C_4H_9)_4$,
  $Ti(O-iso-C_4H_9)_4$,
  $Ti(O-2-ethylhexyl)_4$.

Among them, titanium tetrahalides and alkoxy titanium trihalides, are preferable. In particular, use of alkoxy titanium trihalides are preferable. These titanium compounds may be used alone or a combination of two or more compounds may be used. The titanium compounds may be diluted with hydrocarbon or hydrocarbon halide.

On preparation of the solid titanium catalyst component (a), an electron donor may be used according to needs. As such an electron donor, oxygen containing electron donors such as alcohol, phenol, keton, aldehyde, carboxylic acid, ester of organic acid or inorganic acid, ether, acid amid, acid anhydride, alkoxysilane and electron donors containing nitrogen such as anmonia, amine, nitrile, and isocyanate may be used.

Specific examples of the electron donor include;

alcohols having 1 to 18 carbon atoms such as methanol, ethanol, propanol, pentanol, hexanol, octanol, dodecanol, octadecyl alcohol, benzyl alcohol, phenylethyl alcohol, cumil alcohol, and isopropylbenzyl alcohol;

phenols having 6 to 20 carbon atoms which may have a lower alkyl group, such as phenol, cresol, xylenol, ethyl phenol, propyl phenol, nonyl phenol, cumil phenol, and naphthol;

ketones having 3 to 15 carbon atoms such as acetone, methyl ethyl ketone, methyl isobutyl ketone, acetophenone, benzophenone, cyclohexane, banzoquionone;

aldehydes having 2 to 15 carbon atoms such as acetaldehyde, propionaldehyde, octylaldehyde, penzaldehyde, tolualdehyde, naphtaldehyde;

organic esters having 1 to 18 carbon atoms such as methyl formate, methyl acetate, ethyl acetate, vinyl acetate, propyl acetate, octyl acetate, cyclohexyl acetate, ethyl propionate, methyl butyrate, ethyl valerate, methyl chloroacetate, ethyl dichloroacetate, methyl methacrylate, ethyl crotonate, ethyl cyclohexanecaboxylate, methyl benzoate, ethyl benzoate, propyl benzoate, butyl benzoate, octyl benzoate, cyclohexyl benzoate, phenyl benzoate, benzyl benzoate, methyl toluylate, ethyl toluylate amyl toluylate, ethyl ethylbenzoate, methyl anisate, ethyl anisate, ethyl ethoxybenzoate, γ-butylolactone, δ-valerolactone, coumarin, phthalide, and ethylene carbonate;

acid halides such as acetyl chloride, benzoyl chloride, chloride toluylate, and chloride anisate;

ethers having 2 to 20 carbon atoms such as methyl ether, ethyl ether, isopropyl ether, butyl ether, amyl ether, tetrahydrofuran, anisole, and diphenyl ether;

acid amids such as N,N-dimethylamid acetate, N,N-diethylamid benzoate and N,N-dimethylamid toluylate;

amines such as methylamine, ethylamine, diethylamine, trimethylamine, triethylamine, tributylamine, piperidine, tribenzylamine, aniline, pyridine, picoline, and tetramethylethyrenediamine;

nitriles such as acetonitrile, benzonitrile, and trinitrile;

organic phosphorus compounds having a P-O-C bond such as trimethyl phosphite, and tirethyl phosphite; and alkoxysilanes such as ethyl silicate and diphenyl dimethoxysilane.

Preferable example of the organic esters is a polyvalent carboxylate. An example of such polyvalent carboxylate is a compound having a skeleton represented by the general formula:

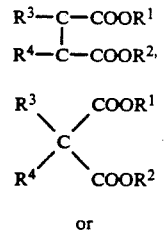

or

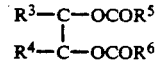

wherein $R^1$ represents a substituted or unsubstituted hydrocarbon group, $R^2$, $R^5$ and $R^6$ represent hydrogen atoms or substituted or unsubstituted hydrocarbon groups, $R^3$ and $R^4$ represent hydrogen atoms or substituted or unsubstituted hydrocarbon groups, preferably at least one of $R^3$ and $R^4$ being a substituted or unsubstituted hydrocarbon group. $R^3$ and $R^4$ may be coupled with each other, and if the hydrocarbon groups, $R^1$ to $R^6$ are substituted, the substituent contains different atoms such as N, O, S and has a group such as C-O-C, COOR, COOH, OH, SO₃H, -C-N-C-, and NH₂.

Specific examples of such a polyvalent carboxylate include aliphatic polycaboxylates such as diethyl succinate, dibutyl succinate, diethyl methylsuccinate, α-diisobutyl methylglutalate, diethyl methylmalonate, diethyl isopropylmalonate, diethyl butylmalonate, diethyl phenylmalonate, diethyl diethylmalonate, diethyl phenylmalonate, diethyl diethylmalonate, diethyl dibutylmalonate, monoctyl maleate, dioctyl maleate, dibutyl maleate, dibutyl butylmaleate, diethyl butylmaleate, β-diisopropyl methylglutalate ethylsuccinate, di-2-ethylhexyl fumarate, diethyl itaconate, dioctyl citraconate;

aliphatic polycarboxylates such as 1,2-diethyl cyclohexanecarboxylate, carboxylate, 1,2-diisobutyl cyclohexanecarboxylate, diethyl tetrahydrophthalate, and diethyl nazicate;

aromatic polycarboxylates such as monoethyl phthalate, dimethyl phthalate, methylethyl phthalate, monoisobutyl phthalate, diethyl phthalate, ethylisobutyl phthalate, di-n-propyl phthalate, diisopropyl phthalate, di-n-butyl phthalate, diisobutyl phthalate, di-n-heptyl phthalate, di-2-ethylhexyl phthalate, di-n-octyl phthalate, dineopentyl phthalate, didecyl phthalate, benzylbutyl phthalate, diphenyl phthalate, benzylbutyl phthalate, diphenyl phthalate, diethyl naphthalenedicarboxylate, dibutyl naphthalenedicarboxylate, triethyl trimellitate, dibutyl trimellitate and different ring polycarboxylates such as 3,4-furan dicarboxylic acid.

Other examples of the polyvalent carboxylates include esters of long chain dicarboxylates such as diethyl adipate, diisobutyl adipate, diisopropyl sebasate, di-n-butyl sebasate, di-n-octyl sebasate, di-e-ethylhexyl sebasate. Among these compounds, use of a carboxylate is preferable. Use of polyvalent carboxylate, particularly phthalates is more preferable.

The electron donor which is preferably contained in the solid titanium catalyst component (a) has no active electrons as is similar to organic or inorganic esters, alkoxysilane compounds, aryloxysilane compounds, ethers, ketones, tertiary alcohols, acid halides, acid anhydrides. As the electron donor, organic esters, alkoxysilane compounds and aryloxysilane compounds are preferable. Among them, the more preferable donor is an ester of an aromatic monocarboxylic acid with an alcohol having 1 to 8 carbon atoms and an ester of dicarboxylic acid such as malonic acid, substituted malonic acid, substituted succinic acid, maleic acid, substituted maleic acid, 1,2-cyclohexylcarboxylic acid and phthalic acid with an alcohol having more than one carbon atom.

The electron donor should not necessarily be used as a starting material and may be produced in the course of preparation of the solid titanium catalyst component. The solid titanium catalyst component may be prepared by contacting the above-mentioned magnesium compounds the titanium compounds and the electron donor, a carrier compound and reaction accelerator which are added if necessary with each other.

The carrier compound includes $Al_2O_3$, $SiO_2$, $B_2O_3$, MgO, CaO, $TiO_2$, ZnO, $ZnO_2$, $SnO_2$, BaO, ThO and a resin such as styrene-divinylbenzene copolymer. Among them, $Al_2O_3$, $SiO_2$ and the styrene-divinylbenzene copolymer are preferable.

As a reaction accelerator, organic and inorganic compounds containing silicon, phosphorus, aluminium, etc. may be used.

The solid titanium catalyst component (a) is prepared by contacting the magnesium compounds, the titanium compound, and the electron donor if necessary and further the carrier compound if necessary with each other.

The method of preparing the solid titanium catalyst component (a) is not particularly restricted. Several preparing methods will now be briefly described as follows:

(1) A magnesium compound, and electron donor and a titanium compound are contacted with each other in desired order to react with each other. For the reaction, each component may be preliminarily processed with the electron donor and/or a reaction accelerator such as organic aluminium compound and silicon compound containing halogen. The electron donor is used at least one time in this method.

(2) A liquid magnesium compound having no reducing power is reacted with a liquid titanium compound in the presence of an electron donor to precipitate a solid magnesium-titanium double compound.

(3) The reaction product obtained by the method (2) is further reacted with a titanium compound.

(4) The reaction product obtained by the method (1) or (2) is further reacted with an electron donor or a titanium compound.

(5) A solid material obtained by pulverizing a magnesium compound, an electron donor and a titanium compound is processed with any one of a halogen, a halogen compound and an aromatic hydrocarbon. This method may include a step for pulverizing only the magnesium compound, a complex compound including the magnesium compound and the electron donor or the magnesium compound and a titanium compound. After pulverizing, the pulverized material may be preliminarily processed with a reaction accelerator and then be processed with halogen and the like. The reaction accelerator may include an organic aluminium compound or a silicon compound containing halogen.

(6) The compound obtained by the methods 1 to 4 is processed with a halogen, a halogen compound or an aromatic hydrocarbon.

(7) The reaction product which is obtained by contacting a metal oxide, an organic magnesium compound and a halogen containing compound is contacted with an electron donor and a titanium compound.

(8) A magnesium compound such as magnesium salt of organic acid, alkoxymagnesium and aryloxymagnesium is reacted with an electron donor, a titanium compound and/or a halogen containing hydrocarbon.

(9) A hydrocarbon solution containing at least a magnesium compound and an alkoxy titanium; a titanium compound; an electron donor and a halogen containing compound such as halogen containing silicon compound added if necessary are reacted with each other.

(10) A liquid magnesium compound having no reducing power is reacted with an organic aluminium compound to precipitate a solid magnesium-aluminum double compound, which is then reacted with an electron donor and a titanium compound.

When the solid titanium catalyst component (a) is prepared by such a method, the amounts of the magnesium compound, the titanium compound and the electron donor added according to needs are different depending upon the king, the contact conditions and the order of contact. For 1 mole of magnesium, the electron donor preferably is used in an amount of 0.01 to 5 moles, particularly preferably 0.1 to 1 mole and the liquid titanium compound is preferably used in an amount of 0.1 to 1000 moles, particularly preferably 1 to 200 moles.

The temperature at which these compounds are contacted with each other is usually −70° C. to 200° C., preferably 10° C. to 150° C.

The solid titanium catalyst component (a) obtained by the above mentioned methods may be purified by being sufficiently washed with liquid inactive hydrocarbon. Examples of the inactive hydrocarbons which may be used for this end include:

aliphatic hydrocarbons such as n-pentene, isopentene; n-hexene, isohexene, n-heptane, n-octane, isooctane, n-decane, n-dodcane, kerosine, fluid paraffin;

cycloaliphatic hydrocarbons such as cyclopentene, methylcyclopentene, cyclohexane, methylcyclohexane;

aromatic hydrocarbons such as benzene, toluene, xylene, cymene; and hydrocarbon halides such as chlorobenzene, dichloroethane and the mixture thereof.

The olefin polymerization catalyst used for manufacturing the α-olefin random copolymer used in the present invention comprises the above mentioned solid titanium catalyst component (a) and the organic aluminium compound catalyst component (b).

The organic aluminium compound catalyst component (a) may include, for example, (1) an organic compound represented by the general formula $R^1_m Al(OR^2)_n H_p X_q$ wherein $R^1$ and $R^2$ represent hydrocarbon groups generally having 1 to 15 carbon atoms, preferably 1 to 4 carbon atoms, which may be the same or different, X represents a halogen atom, $0 < m \leq 3$, $0 \leq n \leq 3$, $0 \leq p \leq 3$, $0 \leq q \leq 3$ provided that $m+n+p+q=3$; and (2) a complex alkylated compound between a first group metal and aluminium, represented by a general formula $M^1 AlR^1_4$ wherein $M^1$ represents Li, Na, K and $R^1$ is the same as above.

Examples of the organic aluminium compound belonging to the above mentioned (1) include
a compound represented by the general formula $$R^1_m Al(OR^2)_{3-m}$$

wherein $R^1$ and $R^2$ are same as above and m is preferably $1.5 \leq m \leq 3$;

a compound represented by the general formula $$R^1_m AlX_{3-m}$$

wherein $R^1$ is the same as above, X represents a halogen atom, m is preferably $0 > m > 3$;

a compound represented by the general formula $$R^1_m Al(OR^2)_n X_q$$

wherein $R^1$ and $R^2$ are the same as above, X represents a halogen atom $0 < m \leq 3$, $0 \leq n < 3$, $0 \leq q < 3$, $m+n+q=3$.

Specific examples of the aluminium compound included in compound (1) include:

trialkyl aluminium such as triethyl aluminium and tributyl aluminium;

trialkenyl aluminium such as triisoprenyl aluminium;

dialkyl aluminium alkoxide such as diethyl aluminum ethoxide, dibutyl aluminium butoxide;

alkyl aluminium sesquialkoxide such as ethyl aluminium sesquiethoxide, and butyl aluminium sesquibutoxide;

partially alkoxylated alkyl aluminium having an average composition represented by the formula $$R^1_{2.5} Al(OR^2)_{0.5};$$

dialkyl aluminium halide such as diethyl aluminium chloride, dibutyl aluminium chloride, diethyl aluminium bromide;

alkyl aluminium sesquihalide such as ethyl aluminium sesquichloride, butyl aluminium sesquichloride, ethyl aluminium sesquibromide;

partially halogenated alkyl aluminium such as ethyl aluminium dichloride, propyl aluminium dichloride, butyl aluminium dibromide;

dialkyl aluminium hydride such as diethyl aluminium hydride, dibutyl aluminium hydride;

alkyl aluminium dihydride such as ethyl aluminium dihydride, propyl aluminium dihydride and the other partially hydrogenated alkyl aluminium; and other partially alkoxylated and halogenated alkyl aluminium such as ethyl aluminium ethoxychloride, butyl aluminium butoxychloride, ethyl aluminium ethoxybromide.

The compound analogous to the compound (1) may include an organic aluminium compound having two or more aluminium atoms which are bonded with each other through an oxygen or nitrogen atom.

Such an organic compound includes, for example, $$(C_2H_5)_2AlOAl(C_2H_5)_2, \quad (C_4H_9)_2AlOAl(C_4H_9)_2,$$

$$(C_2H_5)_2AlNAl(C_2H_5)_2,$$
$$\phantom{(C_2H_5)_2AlN}|$$
$$\phantom{(C_2H_5)_2AlN}CH_2H_5$$

and methyl aluminoxane.

A compound included in (2) includes, for example, $LiAl(C_2H_5)_4$ and $LiAl(C_7H_{15})_4$.

Among the compounds of (1) and (2), particularly use of trialkyl aluminium or alkyl aluminium which is bonded with the above mentioned two or more aluminium compounds is preferable.

The olefin polymerizing catalyst used for manufacturing the α-olefin random copolymer [A], constituting the polyolefin composition of the present invention comprises the solid titanium catalyst component (a), the organic aluminium compound catalyst component (b) and the electron donor (c) if necessary. The electron donor (c) includes amines, amides, ethers, ketones, nitriles, phosphines, stibines, arsines, phosphormamides, esters, thioethers, thioesters, acid anhydrides, acid halids, aldehydes, alcoholates, alkoxy (aryloxy) silanes, organic acids and salts of metals which belong to groups I to IV of the Periodic Table. The salts may be formed by a reaction between an organic acid and an organic metal compound.

Specific examples of the electron donor (c) include the electron donor used for the preparation of the above mentioned titanium component (a). An excellent result is obtained when organic acid ester, the alkoxy (aryloxy) silane compound, ether, ketone, acid anhydride or amides, etc. used as the electron donor (c). Particularly if the electron donor in the solid titanium catalyst component (a) is a monocarboxylate, it is preferable that an alkyl ester of an aromatic carboxylic acid be used as the electron donor (c).

If the electron donor in the solid titanium catalyst component (a) is an ester between the dicarboxylic acid which has been mentioned as a preferable compound and an alcohol having two or more carbon atoms, it is preferable that an organic silicon compound represented by the following general formula be used as the electron donor (c).

$$R_nSi(OR')_{4-n}$$

wherein R and R' represent hydrocarbon groups, $0<n<4$.

Specific examples of the organic silicon compound represented by the general formula set forth above include trimethylmethoxysiloxane, trimethylethoxysilane, dimethyldimethoxysilane, dimethyldiethoxysilane, diisopropyldimethoxysilane, t-butylmethyldimethoxysilane, t-amylmethyldiethoxysilane, diphenyldimethoxysilane, phenylmethyldimethoxysilane, diphenyldiethoxysilane, bis o-triledimethoxysilane, bis m-triledimethoxysilane, bis p-triledimethoxysilane, bis p-triledimethoxysilane, bisethylphenyldimethoxysilane, dicyclohexyldimethoxysilane, cyclohexylmethyldimethoxysilane, cyclohexylmethyldiethoxysilane, ethyltrimethoxysilane, ethyltriethoxysilane, vinyltrimethoxysilane, methyltrimethoxysilane, n-propyltriethoxysilane, decyltrimethoxysilane, decyltriethoxysilane, phenyltrimethoxysilane, α-chloropropyltrimethoxysilane, methyltriethoxysilane, ethyltriethoxysilane, vinyltriethoxysilane, t-butyltriethoxysilane, n-butyltriethoxysilane, isobutyltriethoxysilane, phenyltriethoxysilane, α-aminopropyltriethoxysilane, chlorotriethoxysilane, ethyltriisopropoxysilane, vinyltributoxysilane, cyclohexyltrimethoxysilane, cyclohexyltriethoxysilane, 2-norbornanetrimethoxysilane, 2-norbornanetriethoxysilane, 2-norbornanemethyl-dimethoxysilane, ethyl silicate, butyl silicate, trimethylphenoxysilane, methyltriallyloxysilane, vinyltris (β-methoxyethoxysilane), vinyltriacetoxy-silane, dimethyltetraethoxydisiloxane;

cyclopentyltrimethoxysilane, 2-methylcyclopentyltrimethoxysilane, 2,3-dimethylcyclopentyltrimethoxysilane, cyclopentyltriethoxysilane;

dicyclopentyldimethoxysilane, bis(2-methylcyclopentyl)dimethoxysilane, bis(2,3-dimethylcyclopentyl)dimethoxysilane, dicyclopentyldiethoxysilane; and tricyclopentylmethoxysilane, tricyclopentylethoxysilane, dicyclopentylmethylmethoxysilane, dicyclopentylethylmethoxysilane, hexenyltrimethoxysilane, dicyclopentylmethylethoxysilane, cyclopentyldimethylmethoxysilane, cyclopentyldiethylmethoxysilane, and cyclopentyldimethylethoxysilane.

Among them, it is preferable to use ethyltriethoxysilane, n-propyltriethoxysilane, t-butyltriethoxysilane, vinyltriethoxysilane, phenyltriethoxysilane, vinyltributoxysilane, diphenyldimethoxysilane, phenylmethyldimethoxysilane, bis p-triledimethoxysilane, p-trilemethyldimethoxysilane, dicyclohexyldimethoxysilane, cyclohexylmethyldimethoxysilane, 2-norbornanetriethoxysilane, 2-norbornanemethyldimethoxysilane, phenyltriethoxysilane, dicyclopentyldimethoxysilane, hexenyltrimethoxysilane, cyclopentyltriethoxysilane, tricyclopentylmethoxysilane, and cyclopentyldimethylmethoxysilane. Two or more of these organic silicon compounds may be mixed and used.

The olefin polymerizing catalyst used for copolymerization may be a catalyst formed from a metallocene component (d) and an aluminoxane component (e).

The metallocene component (d) may be represented by the general formula as follows:

wherein M represents zirconium, titanium, or hafnium, L represents a ligand having a cycloalkadienyl skeletal structure, two of L may be bonded with each other via an alkylene group, a substituted alkylene group and a silylene group, X and Y represent hydrocarbon groups having 1 to 12 carbon atoms, alkoxy groups and aryloxy groups, halogens and hydrogen atoms.

Examples of the ligand having a cycloalkadienyl skeletal structure include alkyl substituted cyclopentadienyl groups such as a cyclopentadienyl group, a methylcyclopentadienyl group, a pentamethylcyclopentadienyl group, and indenyl group, and a fluorenyl group.

The alkylene group includes a methylene group, a ethylene group, and a propylene group. The substituted alkylene group includes an isopropylidene group. The substituted silylene group includes dimethylsilylene and diphenylsilylene groups.

X and Y represent hydrocarbon groups having a 1 to 12 carbon atoms, alkoxy groups, aryloxy groups, halogen and hydrogen atoms.

Examples of the hydrocarbon groups having 1 to 12 carbon atoms include an alkyl group, a cycloalkyl group, an aryl group, and aralkyl group. Specifically the alkyl group includes a methyl group, an ethyl group, a propyl group, a isopropyl group, and a butyl group.

Examples of the cycloalkyl groups includes cyclopentyl group and a cyclohexyl group.

The aryl group includes a phenyl group, and a trile group.

The aralkyl group includes a benzyl group and a neophyl group.

The alkoxy group includes a methoxy group, an ethoxy group and a buthoxy group.

The aryloxy group includes a phenoxy group.

The halogen includes fluorine, chlorine, bromine and iodine.

Specific examples of the transition metal compounds including a ligand having a cycloalkadienyl skeletal structure in which M is zirconium, include:
bis(cyclopentadienyl)zirconium chloride,
bis(cyclopentadienyl)zirconium dibromide,
bis(cyclopentadienyl)methyl zirconium monochloride,
bis(cyclopentadienyl)ethyl zirconium monochloride,
bis(methylcyclopentadienyl)zirconium dichloride,
bis(indenyl)zirconium dichloride,
bis(cyclopentadienyl)zirconium diemthyl,
bis(cyclopentadienyl)zirconium methoxychloride,
bis(cyrolpentadienyl)zirconium ethoxychloride,
ethylene bis(indenyl)dimethyl zirconium,
ethylene bis(indenyl)zirconium dichloride,
ethylene bis(4,5,6,7-tetrahydro-1-indenyl)zirconium dichloride,
dimethylsilylene bis(cyclopentadienyl)zirconium dichloride, dimethylsilylene bis(indenyl)zirconium dichloride, and dimethylsilylene bis(methylcyclopentadienyl)zirconium dichloride.

In lieu of the above mentioned zirconium compounds, compounds in which zirconium is substituted with titanium or hafnium may be used.

The aluminoxane component (e) may be produced by the following methods.

(1) Hydrocarbon solvent suspension of a compound containing adsorption water or salts containing water of crystallization, such as magnesium chloride hydrate, copper sulfate hydrate, aluminium sulfate hydrate, nickel sulfate hydrate and cerium chloride hydrate is added with organic aluminium compound such as trialkyl aluminium so that they react with each other and the component (e) is recovered in the form of solution of hydrocarbon.

(2) Water, ice or water vapor is directly acted upon an organic aluminium compound such as trialkyl aluminium in a solvent such as benzene, toluene, ethyl ether, tetrahydrofuran and the component (e) is recovered in the form of hydrocarbon solution.

The aluminoxane may contain a small amount of organic metal component. The aluminoxane may be solved in a solvent again after a solvent or unreacted organic aluminium compound is removed from the recovered aluminoxane solution by distillation.

The organic aluminium compounds used for the preparation of the aluminoxane includes the compounds which have been exemplarily described as the organic aluminium compound catalyst component (b).

Among them, particularly trialkylaluminium is preferably used.

The above mentioned organic aluminium compounds may be used alone or combinedly.

The solvent used for a solution of the aluminoxane includes aromatic hydrocarbons such as benzene, toluene, xylene, cumene, and cymene, aliphatic hydrocarbons such as pentane, hexane, heptane, octane, decane, dodecane, hexadecane, octadecane; cycloalphatic hydrocarbons such as cyclopentane, cyclohexane, cyclooctane, methylcyclopentane; petroleum fractions such as gasoline, kerosine and gas oil, and hydrocarbon solvents such as halides particularly chlorides and promides of the above mentioned aromatic hydrocarbons, aliphatic hydrocarbons and cycloaliphatic hydrocarbons. Furthermore ethers such as ethyl ether and tetrahydrofuran may be used. Among the solvents, aromatic hydrocarbons are particularly preferable.

Specific examples of the inactive hydrocarbon medium used include: aliphatic hydrocarbons such as propane, butane, pentane, hexane, heptane, octane, decane, dodecane, and kerosine;

cycloaliphatic hydrocarbons such as cyclopentane, cyclohexane, and methylcyclopentane; and aromatic hydrocarbons such as benzene, toluene, and xylene;

hydrocarbon halides such as ethylene chloride and chlorobenzene and the mixture thereof. Liquid α-olefin or aromatic vinyl monomer may also be used at a polymerization reaction temperature which will be described hereafter.

Preferable usage of each catalyst component in a polymerization system is as follows.

The titanium atoms in the component (a) is in amount of about 0.0001 to 1.0 mm mol per 1 of reaction volume. The metal atoms in the component (b) is in an amount of about 1 to 500 mols per 1 mol of the titanium atoms in the component (a). The component (c) is in an amount of 0.001 to about 10 mols, preferably about 0.01 to about 2 mols, particularly preferably about 0.05 to about 1 mol per 1 mol of the metal atoms in the component (b).

The polymerization temperature may be appropriately selected preferably in the range of about to 200° C., more preferably about 50° to 180° C. The pressure may be appropriately selected. It is preferable that polymerization be performed at a atmospheric pressure or about 50 kg/cm$^2$. The polymerization may be performed in any of batch, semi-continuous and continuous methods.

The molecular weight may be adjusted to some extent by changing the polymerization temperature, usage ratios of the catalyst components. It is most effective to add hydrogen to the polymerization system.

Use Applications

In one embodiment of the present invention, the α-olefin random copolymer is used as it is as an adhesive.

In another embodiment of the present invention, 30 to 90% by weight, preferably 35 to 90% by weight, particularly preferably 40 to 90% by weight of the α-olefin random copolymer is compounded with 70 to 10% by weight, preferably 65 to 10% by weight, particularly preferably 60 to 10% by weight of the tackifier [B].

As the tackifier, various tackifier resins which are usually used for hot-melt binders and self-adhesives may be used. Depending upon a source of monomers to be polymerized, the tackifier resins include:

aliphatic hydrocarbon resins mainly manufactured from $C_4$ fraction, $C_5$ fraction obtained by decomposition of petrolium, naphtha, etc. and the mixture thereof or the fraction thereof, for example, isoprene and 1,3-pentadiene in $C_5$ fraction as main raw material;

aromatic hydrocarbon resins manufactured mainly from styrene derivatives and indenes in $C_9$ fraction obtained by decomposition of petrolium and naphtha, etc.;

aliphatic/aromatic copolymer hydrocarbon resins which are obtained by copolymerization of any of $C_4$ and $C_5$ fraction with $C_5$ fraction;

cycloaliphatic hydrocarbon resins which are obtained by adding aromatic hydrocarbon with hydrogen;

sinthesized terpene hydrocarbon resins having a structure containing aliphatic, cycloaliphatic and aromatic hydrocarbons;

terpene hydrocarbon resins manufactured from α, β-pinene in terpene oil;

cumarone indene hydrocarbon resins manufactured from indene and styrenes in coal tar naphtha;

low molecular weight styrene resins; and rosin resins such as rosins and rosin esters.

In the present invention, a composition mainly including the above mentioned α-olefin random copolymer or this copolymer may be compounded with various additives according to needs. For example, if the composition is used as adhesive, the composition may be added with softening agents such as dioctyl phthalate, dibutyl phthalate, machine oil, process oil and polybutene; waxes having a melting point of 40° to 65° C., such as petrolium parafin wax, polyolefin wax, microwax; fillers such as calcium carbonate, zinc white, titanium oxide, and silica; and antioxidants such as phenol or bisphenol organic compounds and metallic soap.

In order to prepare the hot-melt adhesive composition, a mixture of the α-olefin random copolymer [A], the tackifier [B] if necessary and the above mentioned various additives if necessary is agitated while heating so that an uniform melt is prepared. The melt is formed into granules, flakes, pellets and bars according to use application while cooled. The hot-melt adhesive composition will be used for melting or application again. For example, if it will be used for bonding the corners of molded parts, a bar-shaped composition will be loaded into a welding gun and then used.

In order to prepare a pressure-sensitive adhesive, a mixture including the α-olefin random copolymer [A], the tackifier [B] and the above mentioned various additives added according to needs may be usually kneaded on a roller or alternatively solved in an appropriate solvent.

The present invention provides a hot-melt adhesive which is useful for various substrates such as metal, plastics or paper.

Various surface treated steel plates or foils and light metal plates or foils, such as aluminium are used as the metal substrate. The surface treated steel plates or foils may be subjected to one or more plating treatments such as zinc plating, tin plating, nickel plating, nickel-tin plating or aluminium plating, forming treatment such as electrolytic chromic acid treatment, and chemical treatments such as chromic acid treatment, phosphoric acid treatment and zirconium treatment. As light metal plates or foils, aluminium alloy plates or foils may be used as well as pure aluminium plate or foils. They may be coated with thermoplastic coating materials and/or thermosetting coating materials which are known per se.

As a plastic substrate, molded articles or films made of various plastic are used. The plastic resins include, for example, olefin resins such as polyethylene, polypropylene, ethylene-propylene copolymer, ethylene-vinyl acetate copolymer, and ionomer; polyesters such as polyethylene terephthalate, polybutylene terephthalate, polyethylene terephthalate, polyethylene isophthalate; polyamides such as nylon 6, nylon 6,6, nylon 6-nylon 6,6 copolymer; polyhexamethylene isophthalamide and polyhexamethylene terephthalamide; polycarbonates; vinyl chloride resins and vinylidene chloride resins. The plastics substrate may be unstretched or molecular-orineted by monoaxial or biaxial stretching.

The paper substrate may include glassine paper, pure white roll paper, imitation paper, other packaging paper and kraft paper. Furthermore, synthesized pulp paper, and mixed screened paper between the synthetic pulp and cellulose paper, mixed screened paper between the above mentioned papers and inorganic fibers may also be used.

The hot-melt adhesive of the present invention may be, of course, used for bonding laminates comprising one or more of the above mentioned substrates. The hot-melt adhesive of the present invention may be used for sealing and bonding between a container and a lid, for bonding a plurality of members themselves for integration and for laminating of the above mentioned substrates themselves by utilizing its excellent performances. The adhesion structure may be freely designed. A non-strippable adhesion structure can be provided by using the hot-melt adhesive or a readily strippable adhesion structure may be provided by mixing other olefin resin.

The above mentioned various substrate may be coated with the hot-melt adhesive composition on one side or both sides to provide pressure-sensitive tapes.

For any use applications, the composition of the present invention has advantages that it is excellent in adhesion properties, thermal stability resistance, heat resistance, weather resistance and color shade, that it develops no odor on preparation of the composition and in use and that it is excellent in preservation of flavor of content and sanitary characteristics as a packaging material.

The present invention will be further described with reference to the following examples.

EXAMPLES

The α-olefin random copolymer used in the following example 1 was synthesized as follows:

Synthesis (1) of α-olefin random copolymer

Preparation of solid titanium catalyst component (a)

95.2 g of anhydrous magnesium chloride, 442 ml of decane and 390.6 g of 2-ethylhexyl alcohol were heated at 130° C. for 2 hours for reaction to obtain an uniform solution. 21.3 g of phthalic anhydride was added to the solution and mixed with each other by being agitated at 130° C. for one hour so that the phthalic anhydride was dissolved in uniform solution. After the thus obtained uniform solution was cooled to a room temperature, a total of 75 ml of the uniform solution was dropping charged into 200 ml of titanium over one hour. After completion of charging, the temperature of the mixture liquid was elevated to 110° C., at which the mixture liquid was added with 5.22 g of diisobutyl phthalate and was maintained at the same temperature while being agitated for two hours. After completion of 2 hour reaction, a solid portion was collected by thermal filtration. After the solid portion was suspended in 275 ml of titanium tetrachloride solution again, heating reaction was performed at 110° C. for 2 hours again. After termination of the reaction, the solid portion was collected again by thermal filtration and was sufficiently washed with decane and hexane of 110° C. until no free titanium compound in the solution was detected. The solid titanium catalyst component (a) which has been prepared by the above mentioned procedure was preserved as a decantation slurry. A part of the slurry was dried for the purpose of analyzing the catalyst composition. The component of the obtained titanium catalyst component (a) comprised 2.5% by weight of titanium, 63.2% by weight of chlorine, 20.7% by weight of magnesium and 12.5% by weight of diisobutyl butanephthalate.

Polymerization 800 ml of toluene and 200 ml of styrene were charged into a 2 of polmerizer having agitating blades. After nitrogen bubbling was conducted for 15 minutes, 10 mm mol of tri-isobutyl aluminium and 1 mm mol of trimethylmethoxysilane were charged. Thereafter the bubbling was ceased and butene-1 and hydrogen was continuously introduced to the polymerizer at a rate of 150 per hours, respectively. The solution was elevated in temperature to 60° C. and was added with titanium catalytic component having 0.2 mm mol calculated in terms of titanium atom to commence polymerization. The polymerization was conducted at 60° C. for 30 minutes. The polymerization proceeded in a solution state. The polymerization was stopped by adding isobutyl alcohol. Overall polymer was precipitated in a large amount of methanol and was vacuum dried for one day and night so that 96 g of polymer was obtained. The polymer contained 90.2% by mol of butene-1 and the intrinsic viscosity of the polymer which was measured in decahydronaphthalene at 135° C. was 0.45 d /g.

Synthesis (2) of α-olefin random copolymer

The copolymer of butene-1 and styrene which was used in Examples 2, 3, 5, 6 and 7 was synthesized by changing styrene and butene-1 which were used in (Synthesis (1) of α-olefin random copolymer). (Synthesis (3) of α-olefin random copolymer)

The random copolymer of butene-1 and p-methyl styrene which was used in Examples 4 and 8 was synthesized by using an appropriate amount of p-methylene in lieu of styrene in (Synthesis (1) of α-olefin random copolymer).

Synthesis (4) of -olefin random copolymer

The polybutene-1 used in comparative Example 1 was synthesized without using styrene.

Synthesis (5) of α-olefin random copolymer

The propylene-styrene random copolymer used in comparative Example 2 was synthesized by using propylene in lieu of butene-1 and using an appropriate amount of styrene and propylene in (Synthesis (1) of α-olefin random copolymer).

EXAMPLE 1

Butene-1 styrene random copolymer containing 90.2% by mol of butene-1 and having a viscosity ($7_B$) of 7100 centipoise measured at 200° C by means of Brookfield viscometer and a softening point (R&B softening point) of 105° C. measured by the ring and ball method was melted and uniformly applied upon a polyethylene terephthalate plate as the α-olefin random copolymer and was naturally allowed to cool. The coating thickness was 56 μm. A biaxially oriented film of polypropylene was superposed thereon and was heat sealed to the polyethylene terephthalate plate under conditions of 120° C., 3 kg/cm² and ten seconds to obtain a specimen for evaluating the bond strength. Evaluation of the bonding strength of the specimen was conducted by method as follows:

T-peel Test

Peeling speed: 30 cm/minute.

Shear Adhesive Failure Temperature (SAFT) measurement

Temperature elevation speed: 25° C./hour
load: 500 g

The results of the test were shown in Table 1.

In Table 1, $7_B$ represents the viscosity which was measured at 200° C. by means of Brookfield viscometer and $7_E$ represents the viscosity measured at 200° C. by means of Emiller viscometer. The R&B softening point represents the softening point measured by the ring and ball method, PET and OPP represent biaxially oriented films of polyethylene and polypropylene, respectively.

EXAMPLES 2 TO 4

The procedures of Example 1 were repeated in the same manner except that α-olefin aromatic vinyl random copolymer or a bond base was changed as shown in Table 1. The results are shown in Table 1.

COMPARATIVE EXAMPLE 1

The procedures of Example 1 were repeated in the same manner except that polybutene-1 was used in lieu of α-olefin aromatic vinyl random copolymer. The results are shown in Table 1.

COMPARATIVE EXAMPLE 2

The procedures of Example 1 were repeated in the same manner except that polypropylene was used as α-olefin in lieu of butene-1. The results are shown in Table 1.

TABLE 1

|  | Example 1 | Example 2 | Example 3 | Example 4 | Comparative Example 1 | Comparative Example 2 |
|---|---|---|---|---|---|---|
| α-oelfin | butene-1 | butene-1 | butene-1 | butene-1 | butene-1 | propylene |
| aromatic vinyl monomer | styrene | styrene | styrene | p-methylstyrene | — | styrene |
| α-olefin content (% by mol) | 90.2 | 84.0 | 80.6 | 6.2 | 100.0 | 79.0 |
| $7_B$ (centipoise) | 7100 | 4800 | — | — | — | — |
| $7_E$ (centipoise) | — | — | 28500 | 27000 | 7100 | 10100 |
| R & B softening point (°C.) | 105 | 95 | 110 | 110 | >150 | >150 |
| Base | PET/OPP | PET/OPP | aluminum/aluminum | PET/OPP | PET/OPP | PET/OPP |
| Bond strength (g/cm) |  |  |  |  |  |  |
| 20° C. | 2100 | 2800 | 2400 | 3000 | 10 | 30 |
| 50° C. | 700 | 1300 | 2500 | 600 | 10 | 30 |
| SAFT (°C.) | 72 | 57 | 72 | 74 | 93 | 97 |

$7_E$: the viscosity measured at 200° C. by an Emiller viscometer

EXAMPLE 5

50% by weight of butene-1 styrene random copolymer which is an α-olefin random copolymer containing 90.1% by mol of butene-1 and having an intrinsic viscosity of 0.50 measured at 135° C. in decahydronaphthalene and 50% by weight of Alkono P-100 manufactured by Arakawa Kagaku Co., Ltd., a hydrogenated styrene resin (hydrogenation factor 100%) used as a tackifier were melted and mixed with each other at 200° C. for two hours. The obtained mixture was uniformly applied upon a polyethylene terephthalate plate in a melting state and was naturally allowed to cool. The application thickness was 56 mm. A biaxially oriented film of polypropylene was superposed thereon and heat sealed at 120° C. under a pressure of 3 kg/cm² for 10 seconds to obtain a specimen for evaluating the bond strength. T-peel test was conducted at a measured temperature of 20° C. and a peeling speed of 30 cm/min. for evaluating the bond strength of the specimen. The results are shown in Table 2.

EXAMPLES 6 TO 8

The procedures of Example 5 were repeated in the same manner except that a aromatic vinyl monomer and α-olefin content are changed as shown in Table 2. The results are shown in Table 2.

TABLE 2

| | Example 5 | Example 6 | Example 7 | Example 8 |
|---|---|---|---|---|
| α-olefin | butene-1 | butene-1 | butene-1 | butene-1 |
| aromatic vinyl monomer | styrene | styrene | styrene | p-methyl-styrene |
| α-olefin content (% by mol) | 90.1 | 87.5 | 82.3 | 88.1 |
| bond strength (g/cm) | | | | |
| 20° C. | 2,530 | 2,360 | 2,390 | 2,420 |
| 50° C. | 3,510 | 3,740 | 3,170 | 3,350 |
| color shade | light yellow | light yellow | light yellow | light yellow |

What is claimed is:

1. A hot-melt adhesive characterized in that said adhesive comprises a random copolymer of an α-olefin having a straight-chain structure of 4 to 12 carbon atoms and an aromatic vinyl monomer, said α-olefin unit being contained at 50 to 98% by mol in the copolymer, said copolymer having a melting viscosity in the range of 1,000 to 100,000 centipoises at 200° C. and a softening point in the range of 40° to 150° C.

2. A hot-melt adhesive as defined in claim 1 in which said copolymer has an intrinsic viscosity [η] of 0.01 to 7 dl/g which is measured at 135° C. in decahydronaphthalene medium.

3. A hot-melt adhesive as defined in claim 1 in which 60 to 96% by mol of α-olefin unit and 4 and 40% by mol of aromatic vinyl unit are contained.

4. A hot-melt adhesive as defined in claim 1 in which the α-olefin is butene-1.

5. A hot-melt adhesive as defined in claim 1 in which the aromatic vinyl monomer is styrene.

6. A polyolefin composition comprising
[A] 30 to 90% by weight of α-olefin based random copolymer of an α-olefin having a straight-chain structure of 4 to 12 carbon atoms and an aromatic vinyl monomer, said α-olefin based random copolymer containing an unit of the α-olefin in the range of 50 to 96% by mol, and the intrinsic viscosity [η] of the copolymer measured at 135° C. in decahydronaphthalene medium being in the range of 0.01 to 7 dl/g; and
[B] 70 to 10% by weight of a tackifier.

7. An adhesive-bonded structure comprising a plurality of matrices which are selected from the group consisting of metals, plastic resins and papers and an adhesive interposed between the matrices for bonding them with each other, characterized in that said adhesive comprises: [A] 30 to 90% by weight of α-olefin based random copolymer of an α-olefin having a straight-chain structure of 4 to 12 carbon atoms and an aromatic vinyl monomer, said α-olefin based random copolymer containing an unit of the α-olefin in the range of 50 to 96% by mol, and the intrinsic viscosity [η] of the copolymer measured at 135° C. in decahydronaphthalene medium being in the range of 0.01 to 7 dl/g; and [B] 70 to 10% by weight of a tackifier.

* * * * *